Nov. 23, 1948.   H. C. KREMERS ET AL   2,454,462
PRODUCTION OF WELDED SILVER CHLORIDE ARTICLES
Filed Jan. 11, 1946
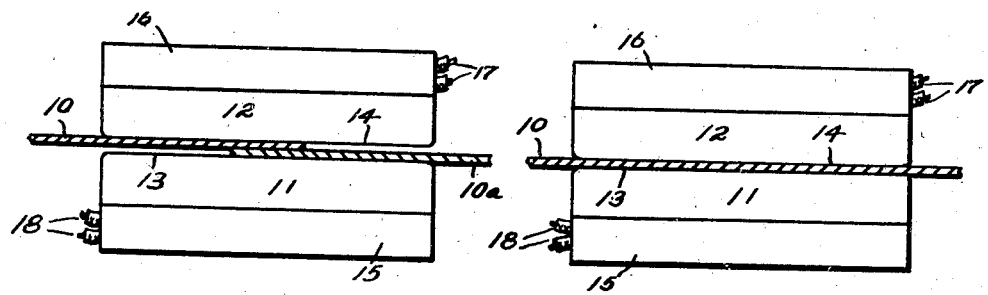
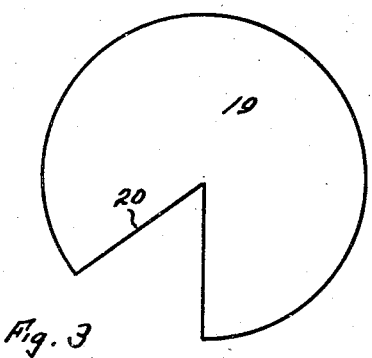
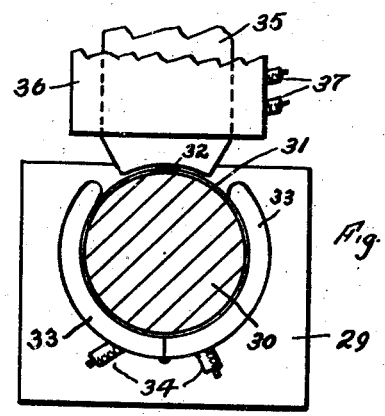
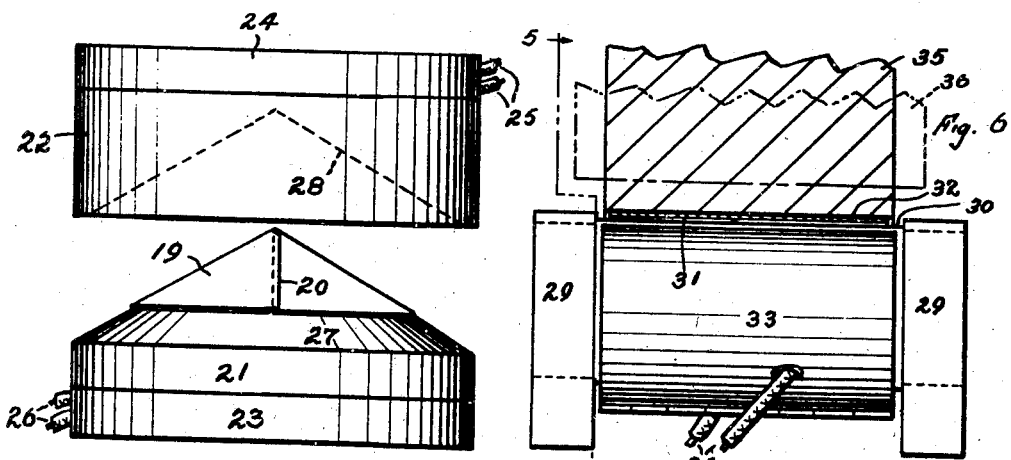
H. C. Kremers
and
R. E. Price
INVENTORS.
BY William H Brown
ATTY.

Patented Nov. 23, 1948

2,454,462

UNITED STATES PATENT OFFICE 2,454,462

PRODUCTION OF WELDED SILVER CHLORIDE ARTICLES

Harry C. Kremers, Cleveland Heights, and Robert E. Price, Cleveland, Ohio, assignors to The Harshaw Chemical Company, Elyria, Ohio, a corporation of Ohio Application January 11, 1946, Serial No. 640,604

6 Claims. (Cl. 154—116)

This invention relates to pressure welding of silver chloride bodies and has for its principal object to provide a process for welding such bodies which will result in a weld having optical properties little if any different from the remaining portions of the body and to avoid operating difficulties due to adherence of the silver chloride to the welding dies.

Other and more limited objects will be in part obvious and in part pointed out hereinafter in connection with the accompanying drawings in which Fig. 1 is a diagrammatic representation of a pair of heated dies in position to begin the welding operation; Fig. 2 is a similar view indicating the condition at the end of the welding operation; Fig. 3 is a plan view of a blank which has been cut from a sheet of silver chloride into a proper shape for forming a cone by our welding process; Fig. 4 is a diagrammatic representation of a pair of dies with heating elements adapted for welding the blank of Fig. 3 to form a cone and showing the said blank in cone shape in position ready to be welded and Figs. 5 and 6 indicate diagrammatically a set of dies suitable for forming a cylinder from silver chloride sheet, Fig. 5 being a section on the line 5—5 of Fig. 6.

We have now discovered that excellent welds, having substantially the same optical properties as other portions of the resulting body can be produced by pressing together the surfaces to be joined at a temperature of the order of 150° to 250° C. and under moderately high pressure, for example, from 1,000 lbs. per sq. in. to 10,000 lbs. per sq. in. or higher, preferably from 4,000 lbs. to 5,000 lbs. per sq. in., the die surfaces in contact with the silver chloride being highly polished material inert to silver chloride, for example, the surface may be chrome plated or composed of polished stainless steel.

In view of the fact that silver chloride has a melting point of about 455° C. it is surprising that perfect welds could be made at the low temperatures indicated. Welding at such low temperatures is highly desirable, however, in view of the tendency of the silver chloride to stick to the dies when welded at higher temperatures. Even at the temperatures indicated we have found it very desirable to use dies having special surfaces such as, in the case of a steel die, a nickel electrodeposit overlaid by a chromium electrodeposit. The die surfaces may be composed of polished stainless steel, for example, ordinary 18—8. It is possible also to use dies having noble metal surfaces but these are relatively expensive and therefore not to be preferred since the others indicated are satisfactory.

In the drawings, we have indicated in a diagrammatic fashion equipment suitable for carrying out our process. It is to be understood that only the dies and heating platens are shown and that pressure is to be applied by means of a suitable press, normally a hydraulic press. In Fig. 1 we have shown two sheets 10 and 10a of silver chloride between dies 11 and 12, the surfaces 13 and 14 of which are chrome plated. These dies are brought to and held at the proper temperature by heating platens 15 and 16 which are of suitable construction adapted to withstand the necessary pressures and which may be provided with internal heating coils supplied with electric current through conductors 17 and 18. In Fig. 2 the elements shown in Fig. 1 have been illustrated in the final position after the weld has been made.

In Figs. 3 and 4 we have shown the blank for making a cone from silver chloride sheet and the dies which we employ for making the weld. The blank 19 is a circular sheet of silver chloride from which a segment has been removed with the exception of a small portion 20 at one edge which is adapted to overlap for forming the weld. The blank 19 is compressed between dies 21 and 22, which are of cone shape, and the edge 20 which overlaps the other straight edge of the blank 19 is welded thereto, the temperature being regulated by means of heating platens 23 and 24 which are supplied with current through the conductors 25 and 26. The surfaces 27 and 28 of the dies 21 and 22 are likewise provided with chrome plated surfaces to avoid sticking of the blank 19 to the dies or reaction therewith which would damage the surfaces of both the silver chloride and the die. The resulting cones are suitable for optical purposes, silver chloride being characterized by high infra-red transmission and the weld being practically undetectable both in respect to light transmission and surface quality.

In Figs. 5 and 6 we have indicated schematically apparatus for forming a cylindrical optical body from silver chloride sheet. Supports 29 receive in suitable openings extending therethrough the reduced end portions of a cylindrical member 30 which serves as a lower die member and helps to shape the body to be produced. A rectangular sheet of silver chloride 31 may be placed in surrounding relation to the member 30 as indicated, one of its edges 32 slightly overlapping the other edge. The silver chloride sheet may be held in the position indicated by a clamp 33 which consists of two halves hinged together and provided with suitable heating means supplied with current through the conductors 34 whereby to have the dual function of holding the silver chloride in place and heating both the silver chloride and the element 30 to the desired welding temperature. The upper die member 35 has a curved lower face concentric with the element 30 when at the end of the welding stroke. A heating device 36 surrounds the upper die member 35 and is supplied with current through conductors 37. Thus, the die members 30 and 35 are maintained at the desired temperature and, when pressed together by a suitable press, complete the weld in a manner analogous to the simpler apparatus shown in Figs. 1 to 4 inclusive. It will be understood that the surfaces of the die members 30 and 35 which come into contact with the silver chloride sheet should be composed of stainless steel or nickel-chrome plated steel.

While we have emphasized the use of die surfaces of chrome or stainless steel, we have indicated that other materials such as the noble metals, gold, platinum and the like can be used. The essential characteristics of the die surfaces are inertness toward silver chloride, sufficient hardness and strength to withstand the stress and a high degree of smoothness or polish whereby to produce a surface of extreme smoothness suitable for optical purposes, that is, to avoid excessive diffusion of light.

Having thus described our invention, what we claim is:

1. A method of welding solid bodies of silver chloride comprising pressing together the surfaces of such bodies to be welded while maintaining the temperature thereof between 150° C. and 250° C.

2. A method of welding silver chloride sheet comprising compressing two overlapping portions of silver chloride sheet between polished die surfaces maintained at a temperature from 150° C. to 250° C., said surfaces being inert to silver chloride at the temperature employed.

3. A process of making a welded silver chloride body comprising bringing two edges of the same sheet of silver chloride into overlapping relation and compressing such overlapping edges under high pressure between highly polished die surfaces at a temperature between 150° C. and 250° C., said die surfaces being composed of material inert to silver chloride at the temperature employed.

4. A method of welding solid bodies of silver chloride comprising pressing together the surfaces of such bodies to be welded at a pressure not less than 1000 lbs. per sq. in. while maintaining the temperature thereof between 150° C. and 250° C.

5. A method of welding silver chloride sheet comprising compressing two overlapping portions of silver chloride sheet between polished die surfaces maintained at a temperature from 150° C. to 250° C., said surfaces being inert to silver chloride at the temperature employed and the compressive force employed being from 1000 to 10,000 lbs. per sq. in.

6. A process of making a welded silver chloride body comprising bringing two edges of the same sheet of silver chloride into overlapping relation and compressing such overlapping edges under high pressure between highly polished die surfaces at a temperature between 150° C. and 250° C., the compressive force employed being from 1000 to 10,000 lbs. per sq. in., and said die surfaces being composed of material inert to silver chloride at the temperature employed.

HARRY C. KREMERS.
ROBERT E. PRICE.

REFERENCES CITED

The following references are of record in the file of this patent:

UNITED STATES PATENTS

| Number | Name | Date |
| --- | --- | --- |
| 1,814,518 | McGrail | July 14, 1931 |
| 2,343,117 | Vincent | Feb. 29, 1944 |
| 2,392,734 | Haberstump | Jan. 8, 1946 |
| 2,401,991 | Walton et al. | June 11, 1946 |